(12) United States Patent
Tang

(10) Patent No.: US 7,058,673 B2
(45) Date of Patent: Jun. 6, 2006

(54) METHOD FOR GENERATING POSITIVE INTEGER NUMBER IN CHINESE NUMBER SYSTEM

(75) Inventor: Frank Yung-Fong Tang, San Jose, CA (US)

(73) Assignee: America Online, Inc., Dulles, VA (US)

( * ) Notice: Subject to any disclaimer, the term of this patent is extended or adjusted under 35 U.S.C. 154(b) by 846 days.

(21) Appl. No.: 09/921,549

(22) Filed: Aug. 2, 2001

(65) Prior Publication Data
US 2003/0028365 A1 Feb. 6, 2003

(51) Int. Cl.
G06F 7/00 (2006.01)

(52) U.S. Cl. ...................................... 708/204

(58) Field of Classification Search ................ 708/204; 704/2
See application file for complete search history.

(56) References Cited

U.S. PATENT DOCUMENTS

2002/0099936 A1 * 7/2002 Kou et al. .................. 713/151

* cited by examiner

Primary Examiner—Tan V. Mai
(74) Attorney, Agent, or Firm—Michael A. Glenn; Glenn Patent Group

(57) ABSTRACT

A method for generating a corresponding Chinese character representation for a positive integer number and a Chinese number generating system that accepts a positive integer number as input and generates a corresponding Chinese character representation.

15 Claims, 3 Drawing Sheets

METHOD FOR GENERATING POSITIVE INTEGER NUMBER IN CHINESE NUMBER SYSTEM

BACKGROUND OF THE INVENTION

1. Technical Field

The invention relates generally to numeric formatting software internationalization. More particularly, the invention relates to a method for generating positive integer number in Chinese number system used in Chinese, Japanese and Korean languages.

2. Description of the Prior Art

One of the important areas of software internationalization is the translation of numeric values to their textual representation. As described in Richard Gillam's article, spelling out numeric values in words can be useful in many aspects. For example, spelled-out numbers values are used on checks and wire-transfer directives because they are harder to counterfeit. In text-to-speech and speech recognition systems, numbers may also need to be spelled out.

Richard Gillam proposed a rule-based approach to solve a more general problem. According to his approach, a list of rules is set up to describe the procedure of number spell-out. Each rule handles a special case of number spell-out by either directly spelling out of a value or by defining a recursive algorithm.

A list of rules is also set up for Generating Chinese character representation of a positive integer value. However, the presented approach does not generate correct number of zero digits between non-zero digits.

What is desired is to develop a method that correctly generates the corresponding Chinese character representation for all positive integer numbers.

SUMMARY OF THE INVENTION

Herein described is an algorithm-based approach, which handles the special treatment of generation for zero digits. This method works for all positive integer numbers.

In a typical embodiment, a Web client is provided to input a positive integer number. A Web server receives the number and passes the number to a CGI program that implements the method of this invention to generate a corresponding Chinese character representation for the number. The Chinese character representation for the number is returned to the Web client to be displayed.

DETAILED DESCRIPTION OF THE INVENTION

A. The System Layout

Figure 1:
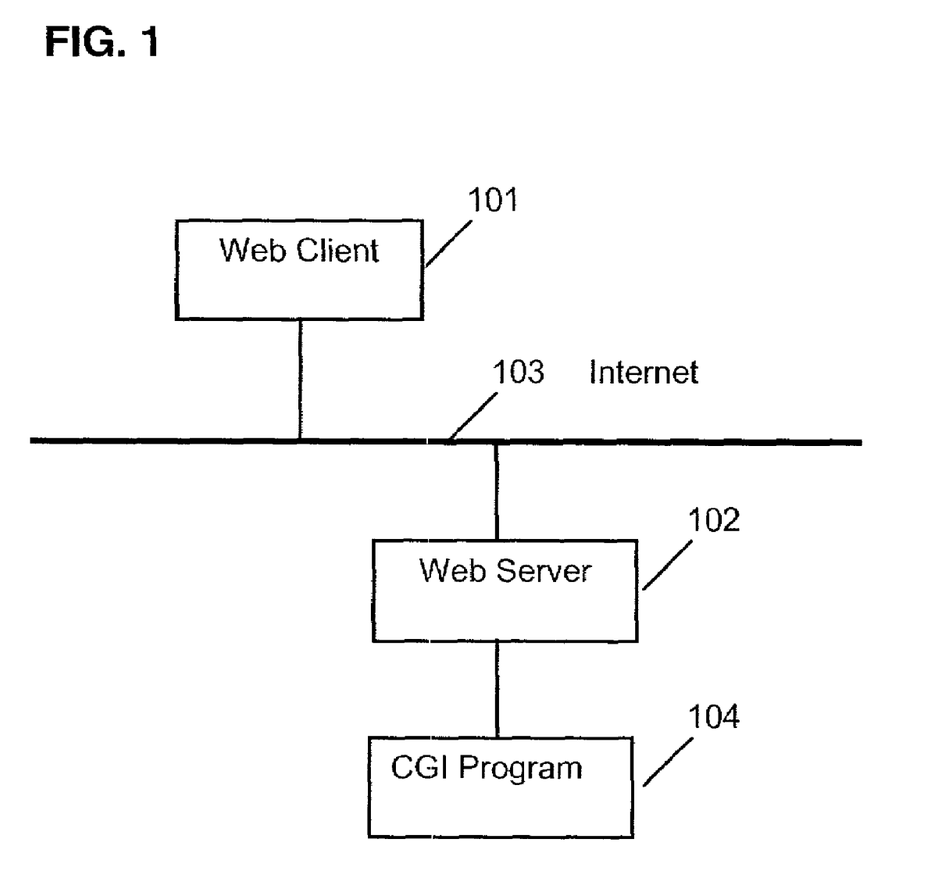
FIG. 1 is block diagram for a system layout of a typical embodiment according to this invention.

FIG. 1 is a block diagram that illustrates a system layout of a typical embodiment of current invention, comprising a Web client 101 and a Web server 102. The Web client 101 communicates with the Web server 102 through the Internet 103.

The Web client 101 inputs a positive integer number to the Web server 102. The Web server 102 runs a CGI program 104 that implements the method that can generate a corresponding Chinese character representation of the given number.

B. The Method

Figure 2:
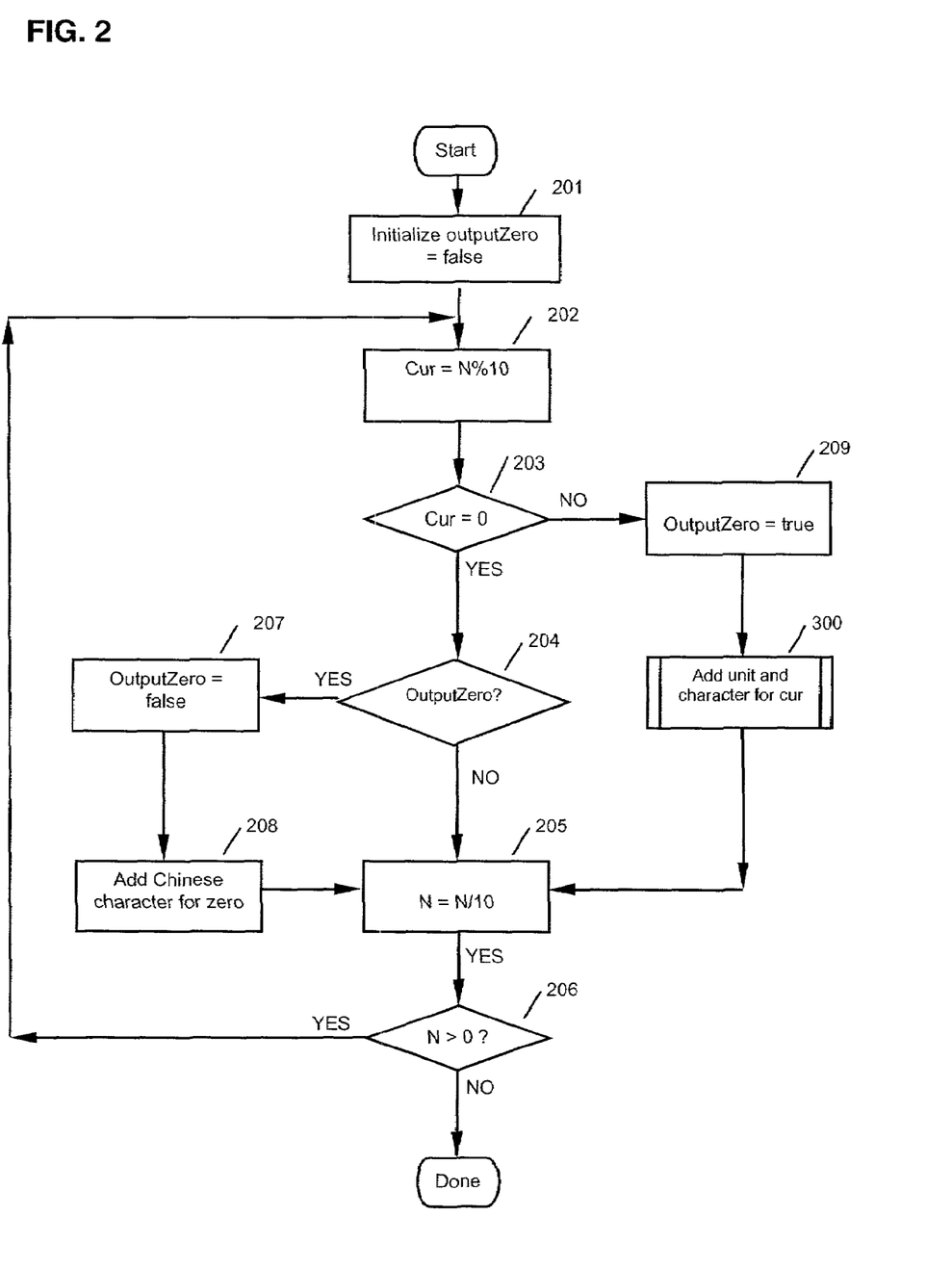
FIG. 2 is a flowchart diagram illustrating a method for representing any integer number.

FIG. 2 is a flow diagram that illustrates a method for generating a corresponding Chinese character representation for a positive integer number N. The method comprises various steps as follows:

Step 201: Initializing a flag outputZero that specifies whether to generate zero to false;

Step 202: Obtaining the remainder cur when N is divided by 10;

The remainder cur is now a single digit number. That is, the cur can be one of 0–9.

Step 203: Checking whether the remainder is equal to zero;

Step 204: If the remainder is equal to zero, checking whether the flag outputZero is true;

Step 205: If the flag outputZero is false, dividing N by 10;

Step 206: Repeating steps 201–205 when N is greater than 0.

If Step 204 determines the flag outputZero is true, the following additional steps are performed:

Step 207: Setting the flag outputZero to false;

Step 208: Adding Chinese character for zero;

Step 207 is necessary so that only one Chinese character zero will be added for consecutive zero digits.

If the remainder cur is not equal to zero as determined by Step 203, the following steps are further performed:

Step 209: Setting the flag outputZero to true;

Step 300: Adding unit and Chinese character for digit cur;

Step 209 is necessary to resume adding Chinese character for zero if one or more zero digits are encountered later.

Figure 3:
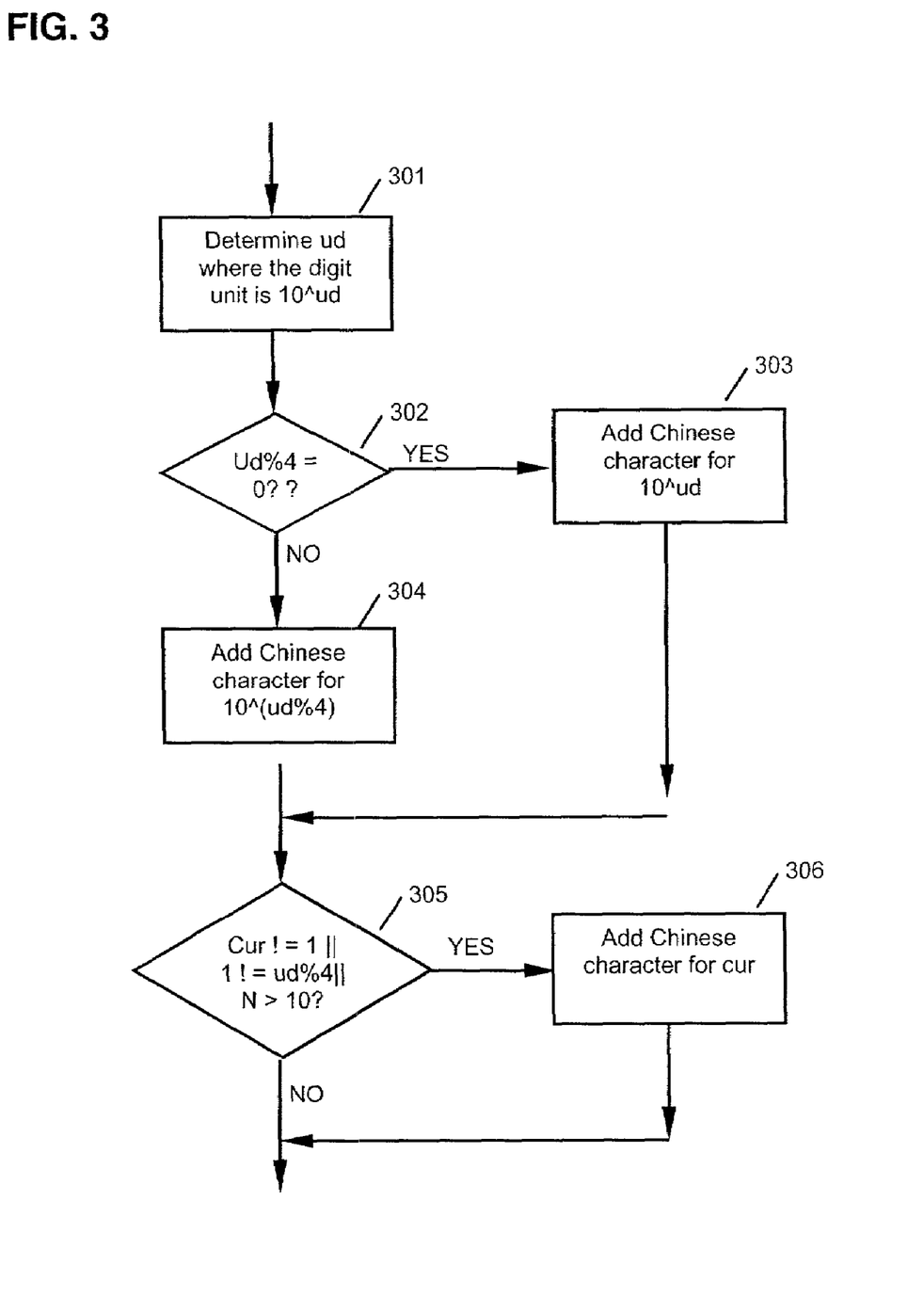
FIG. 3 is a flowchart diagram illustrating the method for adding the units and the digit.

Step 300 of adding unit and Chinese character for digit cur further comprises the following steps as shown in FIG. 3:

Step 301: Determining a position indicating number ud such that $10^{ud}$ is the digit position;

Step 302: Checking whether the position indicating number can be divided by 4;

Step 303: If the position indicating number ud can be divided by 4, adding Chinese character for $10^{ud}$, which is one of ten thousand ($10^4$), one hundred million ($10^8$) and one trillion ($10^{12}$);

Step 304: If the position indicating that number ud can not be divided by 4, adding Chinese character for $10^{(ud\%4)}$, which is one of ten ($10^1$), one hundred ($10^2$) and one thousand ($10^3$);

Step 305: Checking whether the digit to be added is not equal to 1 or whether ud%4 not equal to 1 or whether N is large than 10;

Step 306: If Step 305 returns no, adding Chinese character for the digit cur. Otherwise skipping adding Chinese character for the digit cur.

The method is used to generate a corresponding Chinese character representation for a number in simple form when a simple form Chinese character set is used. It is used to generate a corresponding Chinese character representation for a number in complex form when a complex form Chinese character set is used.

C. Code Listing

Listed hereunder is the C++ code for the algorithm described above:

```
547 static PRUnichar gCJKIdeographicDigit1[10] =
548 {
549    0x96f6, 0x4e00, 0x4e8c, 0x4e09, 0x56db,   // 0 - 4
550    0x4e94, 0x516d, 0x4e03, 0x516b, 0x4e5d    // 5 - 9
551 };
```

```
552 static PRUnichar gCJKIdeographicDigit2[10] =
553 {
554   0x96f6, 0x58f9, 0x8cb3, 0x53c3, 0x8086,   // 0 - 4
555   0x4f0d, 0x9678, 0x67d2, 0x634c, 0x7396    // 5 - 9
556 };
557 static PRUnichar gCJKIdeographicDigit3[10] =
558 {
559   0x96f6, 0x58f9, 0x8d30, 0x53c1, 0x8086,   // 0 - 4
560   0x4f0d, 0x9646, 0x67d2, 0x634c, 0x7396    // 5 - 9
561 };
562 static PRUnichar gCJKIdeographicUnit1[4] =
563 {
564   0x000, 0x5341, 0x767e, 0x5343
565 };
566 static PRUnichar gCJKIdeographicUnit2[4] =
567 {
568   0x000, 0x62FE, 0x4F70, 0x4EDF
569 };
570 static PRUnichar gCJKIdeographic10KUnit1[4] =
571 {
572   0x000, 0x842c, 0x5104, 0x5146
573 };
574 static PRUnichar gCJKIdeographic10KUnit2[4] =
575 {
576   0x000, 0x4E07, 0x4ebf, 0x5146
577 };
578 static PRUnichar gCJKIdeographic10KUnit3[4] =
579 {
580   0x000, 0x4E07, 0x5104, 0x5146
581 };
582
583 static void CJKIdeographicToText(PRInt32 ordinal, nsString& result,
584                                  const PRUnichar* digits,
585                                  const PRUnichar *unit,
```

```
586                         const PRUnichar* unit10k)
587 {
588 // In theory, we need the following if condiction,
589 // However, the limit, 10 ^ 16, is greater than the max of PRUint32
590 // so we don't really need to test it here.
591 // if( ordinal > 9999999999999999)
592 // {
593 //    PR_snprintf(cbuf, sizeof(cbuf), "%ld", ordinal);
594 //    result.Append(cbuf);
595 // }
596 // else
597 // {
598    PRUnichar c10kUnit = 0;
599    PRUnichar cUnit = 0;
600    PRUnichar cDigit = 0;
601    PRUint32 ud = 0;
602    PRUnichar buf[NUM_BUF_SIZE];
603    PRInt32 idx = NUM_BUF_SIZE;
604    PRBool bOutputZero = ( 0 == ordinal );
605    do {
606       if(0 == (ud % 4)) {
607          c10kUnit = unit10k[ud/4];
608       }
609       PRInt32 cur = ordinal % 10;
610       cDigit = digits[cur];
611       if( 0 == cur)
612       {
613          cUnit = 0;
614          if(bOutputZero) {
615             bOutputZero = PR_FALSE;
616             if(0 != cDigit)
617                buf[--idx] = cDigit;
618          }
619       }
```

```
620     else
621     {
622         bOutputZero = PR_TRUE;
623         cUnit = unit[ud%4];
624
625         if(0 != c10kUnit)
626             buf[--idx] = c10kUnit;
627         if(0 != cUnit)
628             buf[--idx] = cUnit;
629         if((0 != cDigit) &&
630            ( (1 != cur) || (1 != (ud%4)) || ( ordinal > 10)) )
631             buf[--idx] = cDigit;
632
633         c10kUnit = 0;
634     }
635     ordinal /= 10;
636     ud++;
637
638  } while( ordinal > 0);
639  result.Append(buf+idx,NUM_BUF_SIZE-idx);
640 // }
641
642 }
643
```

D. Execution

In one example, the Web server 102 provides the Web client 101 with a Web page that can input a positive integer number. When the Web client 101 submits the input number to the Web server 102 through the Internet 103, the Web server 102 invokes the CGI program 104 which implements the method of current invention to generate the corresponding Chinese character representation for the number. The Chinese character representation for the number is returned for the input number.

The method or process described above can be carried out by a computer usable medium containing instructions in computer readable form. In other words, the method or process can be incorporated in a computer program, a logic device, E.C., a PLD, ARIC, CR, EPGA, or firmware, and/or can be downloaded from a network, e.g. a Web site over the Internet.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A computer implemented method for generating a corresponding Chinese character representation for a positive integer number, comprising the steps of:
   (a) inputting a positive integer number to a server from a client;
   (b) passing said number to a program executing on said server;
   (c) initializing an output zero flag to false that specifies whether to generate Chinese character zero when one or more zero digits are encountered;
   (d) obtaining a remainder by dividing said number by 10;
   (e) checking whether said remainder equals zero;
   (f) if said remainder is equal to zero, checking whether said output zero flag is true;
   (g) if said output zero flag is false, dividing said number by 10;
   (h) repeating steps (a) to (e) when N is greater than 0 and;
   (i) generating and displaying a corresponding Chinese character representation.

2. The method of claim 1, wherein said remainder is not equal to zero as determined by step (e) further comprising the steps of:
   (j) setting said output zero flag to true so that Chinese character zero will be added when one or more zero digits are encountered; and
   (k) adding Chinese character for unit and adding Chinese character for said remainder.

3. The method of claim 2, wherein said step (l) comprises the sub-steps of:
   (l) determining a position indicating number which is the base ten logarithm of current digit unit;
   (m) checking whether said position indicating number can be divided by 4;
   (n) if said position indicating number can be divided by 4, adding a Chinese character for current position unit;
   (o) checking whether said remainder is not equal to 1 or the unit selecting remainder of said position indicating number divided by 4 is not equal to 1 or N is greater than 10; and
   (p) if previous step returns true, skipping adding Chinese character for said remainder of Step (d).

4. The method of claim 3, wherein if Step (o) returns false, further comprising the step of:
   (q) adding Chinese character for said remainder of Step (d).

5. The method of claim 3, wherein if Step (m) determines said position indicating number can not be divided by 4, further comprising the step of:
   (r) adding Chinese character for 10, 100 or 1000 as determined by a unit selecting remainder of said position indicating number divided by 4.

6. The method of claim 1, wherein said output zero flag is true determined by step (f), further comprising the steps of:
   (s) setting said output zero flag to false so that only one Chinese character for zero is added for consecutive zero digits; and
   (t) adding Chinese character for zero.

7. The method of claim 1, wherein said Chinese characters are selected from a simple form Chinese character set or a complex form character set.

8. A computer usable medium containing instructions in computer readable form for carrying out a process for generating a corresponding Chinese character representation for a positive integer number, wherein said process comprises the steps of:
   (a) initializing an output zero flag to false that specifies whether to generate Chinese character zero when one or more zero digits are encountered;
   (b) obtaining a remainder by dividing said number by 10;
   (c) checking whether said remainder equals zero;
   (d) if said remainder is equal to zero, checking whether said output zero flag is true;
   (e) if said output zero flag is false, dividing said number by 10; and
   (f) repeating steps (a) to (e) when N is greater than 0.

9. The computer usable medium of claim 8, wherein when said remainder is not equal to zero as determined by step (c), said process further comprises the steps of:
   (g) setting said output zero flag to true so that Chinese character zero will be added when one or more zero digits are encountered; and
   (h) adding Chinese character for unit and adding Chinese character for said remainder.

10. The computer usable medium of claim 9, wherein said step (h) comprises the sub-steps of:
   (i) determining a position indicating number which is the base ten logarithm of current digit unit;
   (j) checking whether said position indicating number can be divided by 4;
   (k) if said position indicating number can be divided by 4, adding a Chinese character for current position unit;
   (l) checking whether said remainder is not equal to 1 or the unit selecting remainder of said position indicating number divided by 4 is not equal to 1 or N is greater than 10; and
   (m) if previous step returns true, skipping adding Chinese character for said remainder of Step (b).

11. The computer usable medium of claim 10, wherein if Step (l) returns false, said process further comprises the step of:
   (n) adding Chinese character for said remainder of Step (b).

12. The computer usable medium of claim 10, wherein if Step (j) determines said position indicating number can not be divided by 4, said process further comprises the step of:

(o) adding Chinese character for 10, 100 or 1000 as determined by a unit selecting remainder of said position indicating number divided by 4.

13. The computer usable medium of claim 8, wherein when said output zero flag is true determined by step (d), said process further comprises the steps of:
(p) setting said output zero flag to false so that only one Chinese character for zero is added for consecutive zero digits; and
(q) adding Chinese character for zero.

14. The computer usable medium of claim 8, wherein said Chinese characters are selected from a simple form Chinese character set or a complex form character set.

15. The computer usable medium of claim 8, wherein said instructions in a computer readable form may be downloaded from a Website over the Internet.

* * * * *